Jan. 21, 1941.    R. KÜMMICH    2,229,461
COIL COUPLING FOR GONIOMETERS
Filed Feb. 1, 1937
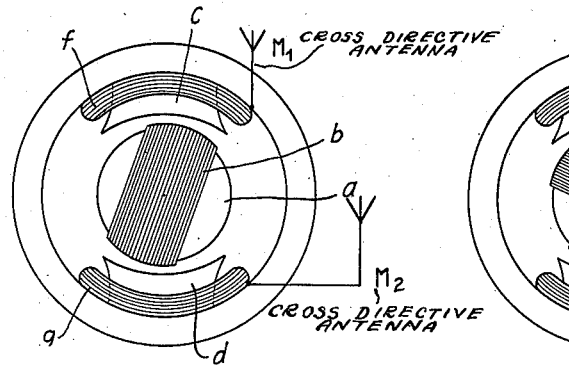
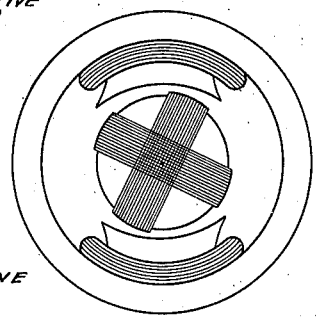
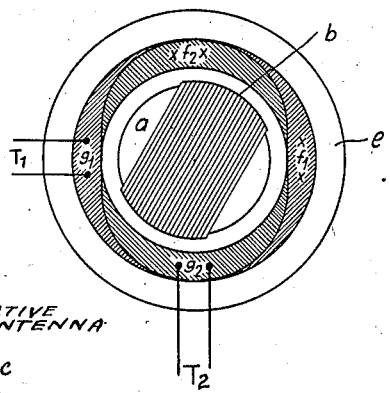
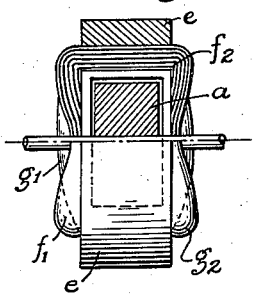
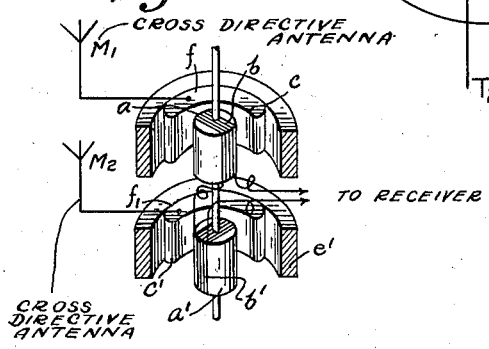
INVENTOR
RICHARD KÜMMICH
BY
ATTORNEY Patented Jan. 21, 1941

2,229,461

UNITED STATES PATENT OFFICE 2,229,461

COIL COUPLING FOR GONIOMETERS

Richard Kümmich, Berlin, Germany, assignor to Telefunken Gesellschaft fur Drahtlose Telegraphie m. b. H., Berlin, Germany, a corporation of Germany Application February 1, 1937, Serial No. 123,352
In Germany January 28, 1936

6 Claims. (Cl. 250—11)

This invention relates to a coil coupling such as used in goniometer arrangements for connection to crossed frames or with an open antenna in which a part of the magnetic field passes through iron containing material. It is the object of the invention to provide a definite shape of the iron containing material and of the winding having the effect that despite close coupling, the goniometer furnishes true angles, and the tuning remains the same at each angular position.

The usual coil coupling for goniometers consists of three air coils, whereby two coils are crossed and are mostly fixedly arranged exciter coils (field coils) connected to the crossed frames in frame goniometers, for instance, and a movable finder coil to which the receiver is connected. The ideal goniometer has a coupling between each exciter coil and the finder coil which varies with the angle of rotation in accordance with the sine, and this variation of the coupling automatically insures the true angle of the goniometer and the constancy of tuning. Two air coils turnable relative to each other about a common axis furnish only at a very loose coupling, a coupling varying in a sinusoidal fashion, and at fixed coupling, the deviation from the sine causes errors in the angle readings and detuning at turning. It is true that with a second finder coil displaced by a certain angle and connected in series with the first coil, the greatest errors in the angle positions can be compensated, but not the change in the tuning which is, also disturbed due to the fact that especially in case of closer couplings, the capacity between the fixed coils and the movable coils greatly varies with the angle.

Aside from these electrical deficiencies the air goniometer has structural disadvantages. For the sake of precision the coils must be rather large, therefore, necessitating a large metallic shielding cup. Furthermore, the conductor turns have to be wound or threaded in a tiresome manner, and when a change in the inner turns is found necessary, the outer turns must be removed. As a further drawback for each goniometer the angle between the two finder coils must be determined anew through cumbersome measurements when any change is made in the conductor turns, which is a serious disadvantage as regards manufacture.

The idea appeared to be obvious that as in the case of ordinary tuning coils, smaller dimensions and closer couplings could be arrived at by using iron containing materials within the coils. However, it was found that although solely through this measure the coupling could be increased, the errors become greater than in case of air goniometers owing to the distortion of the magnetic field. Furthermore, the structural and manufacturing disadvantages are thereby not eliminated.

In accordance with the invention by means of certain shaping of the actual material and the winding, it is accomplished that despite a close coupling the errors remain very small. At the same time advantages as regards construction and manufacture can be obtained. The iron containing material consists of two parts, namely the inner part and the outer part enclosing the inner part. An air space (air gap) exists between the inner and the outer part, in which the active part of the winding is situated. The geometrical form of this air gap and the distribution of the turns of the coils along this gap are so chosen that each of the excited field coils produces in the finder coil an electromotive force varying with the angle in a sinusoidal fashion.

Fig. 1 shows an example of an embodiment of the idea of the invention. Fig. 1A is a perspective view partly in section of a first and a second system connected in series together. Fig. 2 is a cross section of another embodiment employing crossed coils on the rotatable element. Fig. 3 is still another embodiment employing a single coil on the rotatable element and a pair of fixed coils having their maximum thickness located ninety degrees from each other. Fig. 4 is an elevation partly in section of Fig. 3. Referring now in detail to Fig. 1, the cylindrical core $a$ consists of iron containing material particularly adapted for radio frequency use and known in Germany as sirufer. Core $a$ carries the rotatable finder coil $b$. The pole shoes $c$ and $d$ as well as the yoke $e$ are made of the same radio frequency iron material as used for the core $a$. The pole pieces carry the exciter coils $f$ and $g$ connected as series or parallel coils to one of the two crossed directive antennas $M_1$ and $M_2$. The currents of these two coils produce in the air gap a magnetic field which permeates the finder coil. The narrowest part of the air gap is in the center of the pole increasing in width towards the outside. The width of the air gap is so proportioned that the magnetic field strength at each point of the circumference of the cylindrical core $a$ varies with the cosine of the angle which the radius vector through this point forms with the pole axis. The above mentioned proportioning may be either mathematically or experimentally determined on the physical embodiment of the structure. Thus, in each winding of the finder coil an E. M. F. will be produced whose amplitude varies in a sinusoidal fashion with the angle which the winding plane forms with the pole axis, and hence in the entire finder coil an E. M. F. is produced whose amplitude is proportional to the cosine of the angle which the coil axis forms with the pole axis, irrespective of the winding width of the finder coil.

A second system exactly identical with the first system and whose exciter coils $f'$ and $g'$ are connected with the second directional antenna as shown by Fig. 1A, is mechanically coupled in a rigid manner with the first system. The finder coils $b$ and $b'$ of the two systems are commonly turnable, are connected in series, and their relative position is so adjusted that the axis of the finder coil of the one system coincides exactly with the pole axis when the axes of the second system are perpendicular.

Such goniometer furnishes true angles, and has no reaction depending on the angular position. If the pole shoe has a shape different from that necessary for producing a magnetic field varying in accordance with the sine, such deviation furnishes errors similar to those obtained by the use of an air coil. In the same manner in which it is possible in air coils to eliminate the errors in the angles to the greater part by the use of two finder coils, this can be accomplished in the described iron goniometer in case of a non-sinusoidal field distribution which according to Fourier can be divided into a fundamental wave and upper harmonics, in that the coil width of the finder coil is appropriately chosen. For a coil width of 120° for instance, the effect of the third harmonics disappears, and at 72° that of the fifth, etc. By choosing an intermediate angle, two upper harmonics can be compensated one against the other.

The arrangement with two systems according to Fig. 1 and Fig. 1A it is true, has the disadvantage that the coupling of the entire system is less by 30% than that of a single system, but despite this fact, useful couplings can still be attained through the use of an iron containing material having a very high permeability. This disadvantage is avoided in an arrangement in which the two field coils are arranged on the cylindrical core at right angles to each other, and the finder coil winding located on the poles such as shown, for instance, in Fig. 2. Since in this arrangement, the induction of each exciter coil slightly depends on the angular position, while furthermore, the two exciter coils are not decoupled in every position, also the currents passing in these coils depends on the angular position in a very definite manner. Hence, in order that the E. M. F. induced in the finder coil varies with the angle according to the sine, the air gap which provides the variable coupling between the exciter coil and the finder coil must have its width so proportioned that the magnetic field strength at each point of circumference of the cylindrical core varies so as to deviate in a very definite manner from the sine course, and which can be accomplished by suitable shaping of the pole pieces.

Fig. 3 shows an example whereby sinusoidal variation of the coupling and a constant reaction between the field coils and finder coils are obtained through shaping of the cross section of the winding of the field coils. Wherein, item $a$ is again the cylindrical core with the finder coil winding $b$, and $e$ represents a coaxial outer ring likewise of cylindrical shape. Thus, the air gap differs from Figs. 1 and 2 in that it has the same width along the entire circumference. The exciter coils $f_1$, $g_1$ shown in cross-section, the section being taken at right angles to the conductors and forming the one field coil of a pair and are so accommodated in the air gap that their winding cross-section varies along the circumference according to the sine, and as shown in the drawing the coils are so arranged and connected with each other at $x$—$x$ that current flows in the conductors located within the air gap forwards on the one half or coil $g_1$, and backwards on the other half or coil $f_1$. The coil leads $T_1$ and $T_2$ are located at points indicated by the dots. The second pair of exciter coils $f_2$, $g_2$ likewise has a winding cross-section following the sine, taken from any point 90° from a similar point on the first coil $f_1$ and $g_1$. The current passing through the exciter coils produces in the air gap a radial magnetic field whose amplitude follows the sine in its course. By radial magnetic field it is meant that if one would plot each degree of angular rotation, starting from a given point, it can be readily seen that the coil winding cross-section varies along the circumference, according to the sine. Likewise, if the cross-section of the winding from the second coil is taken at any given point 90° from a given point of the first coil, it will be noted that this winding likewise follows the sine. It will then be seen that in the finder coil an E. M. F. will be produced which varies with the angle in accordance with the sine. For example, one is not interested in the exact distance from the center of the rotatable coil to the fixed coil winding, only that the location of the winding cross-section of the field coils is such that the effective current density varies in sinusoidal fashion with respect to angular displacement around the outer core. This goniometer furnishes true angles and has a reaction independent of the angles. If, for instance, for reasons in making the winding, the shape of the cross-section of the winding is to deviate from the sinusoidal shape, the angle error can be compensated for by suitable choice of the winding width by increasing or decreasing the number of conductor turns of the finder coil.

In the described constructions the interior part can be withdrawn from the outer part rendering each coil accessible thereby obtaining a great advantage for the structure. Furthermore, the pressing into a shape of the iron containing material once found to be a proper shape can be carried out in an exactly identical manner and in any desired number, thus permitting mass production.

Obviously, in all modes of construction the part played by the interior part can be exchanged with that of the outer part which is the case as regards the possibility of turning, as well as with respect to the shaping of the air gap or of the cross-section of the winding.

In order to avoid capacitive couplings of field coils and finder coils electro-static shields can be used between the windings.

What is claimed is:

1. A magnetic coupling coil for a radio goniometer comprising a cylindrical rotatable core, a winding on a portion of said rotatable core, a pair of fixed coils surrounding said rotatable core, the winding of one of said fixed coils having a cross section such that the effective current density varies from maximum to zero in a sinusoidal fashion at an arc of each ninety degrees, the winding of the other fixed coil having a cross section approximately similar to said first mentioned fixed coil and displaced so that its position of maximum current density is ninety degrees from the maximum current density position of said first mentioned fixed coil.

2. A magnetic coupling coil for a radio goniometer comprising a cylindrical rotatable core, a coaxial outer fixed cylindrical core, a winding on a portion of said rotatable core, a pair of fixed coils interposed between said cylindrical rotatable core and said coaxial outer fixed cylindrical core, the winding of one of said fixed coils having a cross section such that the effective current density varies from maximum to zero in a sinusoidal fashion at an arc of each ninety degrees, the winding of the other fixed coil having a cross section approximately similar to said first mentioned fixed coil and displaced so that its position of maximum current density is ninety degrees from the maximum current density position of said first mentioned fixed coil.

3. A magnetic coupling coil for a radio goniometer comprising a cylindrical rotatable core containing iron, a coaxial outer fixed cylindrical core containing iron, a winding on a portion of said rotatable core, a pair of fixed coils interposed between said cylindrical rotatable core and said coaxial outer fixed fixed cylindrical core, the winding of one of said fixed coils having a cross section such that the effective current density varies from maximum to zero in a sinusoidal fashion at an arc of each ninety degrees, the winding of the other fixed coil having a cross section approximately similar to said first mentioned fixed coil and displaced so that its position of maximum current density is ninety degrees from the maximum current density position of said first mentioned fixed coil.

4. A magnetic coupling coil for a radio goniometer comprising a cylindrical rotatable core, a fixed coaxial cylindrical ring, a winding on a portion of said rotatable core, a pair of fixed coils both having a non-uniform cross section, said fixed coils mounted on said fixed cylindrical ring and arranged to surround the winding on said rotatable core so that a thickened portion of one of the coils is displaced ninety degrees with respect to a thickened portion of the other and the combined cross sectional area of both coils provides a uniform air gap for said rotatable coil to rotate in.

5. A magnetic coupling coil for a radio goniometer comprising a cylindrical rotatable core, a coaxial outer fixed cylindrical core, a winding on a portion of said rotatable core, a pair of fixed coils interposed between said cylindrical rotatable core and said coaxial outer fixed cylindrical core, the winding of one of said fixed coils having a cross-section such that the effective current density varies in a sinusoidal fashion with respect to angular displacement around said outer core, the winding of the other fixed coil having a cross-section which also varies in a sinusoidal fashion with respect to angular displacement around said outer core and displaced so that its position of maximum effective current density is ninety degrees from the maximum effective current density position of said first mentioned fixed coil.

6. A magnetic coupling coil for a radio goniometer comprising a cylindrical rotatable core containing iron, a fixed coaxial cylindrical ring containing iron, a winding on a portion of said rotatable core, a pair of fixed coils both having a non-uniform cross section, said fixed coils mounted on said fixed cylindrical ring and arranged to surround the winding on said rotatable core so that a thickened portion of one of the coils is displaced ninety degrees with respect to a thickened portion of the other and the combined cross-sectional area of both coils provides a uniform air gap for said rotatable coil to rotate in.

RICHARD KÜMMICH.